(12) United States Patent
Neal et al.

(10) Patent No.: US 6,351,784 B1
(45) Date of Patent: *Feb. 26, 2002

(54) SYSTEM FOR DETERMINING WHETHER A SUBSEQUENT TRANSACTION MAY BE ALLOWED OR MUST BE ALLOWED OR MUST NOT BE ALLOWED TO BYPASS A PRECEDING TRANSACTION

(75) Inventors: Danny Marvin Neal, Round Rock; Steven Mark Thurber, Austin, both of TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,930

(22) Filed: Dec. 28, 1998

(51) Int. Cl.$^7$ ................................................ G06F 13/14
(52) U.S. Cl. ........................ 710/128; 710/108; 710/112; 710/129
(58) Field of Search ................................ 710/128, 112, 710/113, 129, 108

(56) References Cited

U.S. PATENT DOCUMENTS

| 5,521,910 A | 5/1996 | Matthews | 370/54 |
|---|---|---|---|
| 5,610,745 A | 3/1997 | Bennett | 359/139 |
| 5,664,223 A | 9/1997 | Bender et al. | 395/842 |
| 5,694,556 A | 12/1997 | Neal et al. | 395/308 |
| 5,905,876 A | * 5/1999 | Pawlowski et al. | 711/117 |
| 6,108,741 A | * 8/2000 | MacLaren et al. | 710/128 |
| 6,138,192 A | * 10/2000 | Hausauer | 395/292 |

FOREIGN PATENT DOCUMENTS

| EP | 713307 A2 | 5/1996 |
|---|---|---|
| EP | 817076 A1 | 1/1998 |

* cited by examiner

Primary Examiner—Thomas Lee
Assistant Examiner—Abdelmoniem Elamin
(74) Attorney, Agent, or Firm—Barry S. Newberger; Winstead Sechrest & Minick P.C.; Leslie Van Leeuwen

(57) ABSTRACT

An apparatus and method for mediating a sequence of transactions across a fabric in a data processing system are implemented. A fabric bridge orders a preceding transaction and a subsequent transaction according to a predetermined protocol. Using the protocol a determination is made whether the subsequent transaction may be allowed to bypass the previous transaction, must be allowed to bypass the previous transaction, or must not be allowed to bypass the preceding transaction. Transactions include load/store (L/S) to system memory, and direct memory access (DMA) to system memory transactions.

23 Claims, 8 Drawing Sheets

| | | DMA OPERATIONS TO SYSTEM MEMORY | | | LOAD/STORE OPERATIONS TO SYSTEM MEMORY | | | |
|---|---|---|---|---|---|---|---|---|
| | PRECEDING TRANSACTION ／ SUBSEQUENT TRANSACTION | DMA WRITE REQUEST TO SYSTEM MEMORY | DMA READ REQUEST TO SYSTEM MEMORY | DMA READ COMPLETION TO SYSTEM MEMORY | STORE REQUEST TO SYSTEM MEMORY | LOAD REQUEST TO SYSTEM MEMORY | COMPLETION REQUEST TO SYSTEM MEMORY | *eieio sync* |
| DMA OPERATIONS TO SYSTEM MEMORY | DMA WRITE REQUEST TO SYSTEM MEMORY | BYPASS NOT ALLOWED 1 | BYPASS ALLOWED 3 | BYPASS ALLOWED | BYPASS ALLOWED | BYPASS ALLOWED | BYPASS ALLOWED | BYPASS ALLOWED |
| | DMA READ REQUEST TO SYSTEM MEMORY | BYPASS NOT ALLOWED 1 | BYPASS ALLOWED | BYPASS ALLOWED | BYPASS ALLOWED | BYPASS ALLOWED | BYPASS ALLOWED | BYPASS ALLOWED |
| | DMA READ COMPLETION FROM SYSTEM MEMORY | BYPASS ALLOWED 3 | BYPASS ALLOWED | BYPASS ALLOWED | BYPASS ALLOWED 3 | BYPASS ALLOWED 3 | BYPASS ALLOWED 3 | MUST BYPASS 2 |

Fig. 4

| PRECEDING TRANSITION → <br><br> SUBSEQUENT TRANSACTION ↓ | DMA OPERATIONS TO SYSTEM MEMORY | | | LOAD/STORE OPERATIONS TO SYSTEM MEMORY | | | |
|---|---|---|---|---|---|---|---|
| | DMA WRITE REQUEST TO SYSTEM MEMORY | DMA READ REQUEST TO SYSTEM MEMORY | DMA READ COMPLETION TO SYSTEM MEMORY | STORE REQUEST TO SYSTEM MEMORY | LOAD REQUEST TO SYSTEM MEMORY | COMPLETION REQUEST TO SYSTEM MEMORY | eieio sync |
| LOAD/STORE OPERATIONS TO SYSTEM MEMORY | | | | | | | |
| STORE REQUEST TO SYSTEM MEMORY | BYPASS ALLOWED | BYPASS ALLOWED | BYPASS ALLOWED | BYPASS ALLOWED 4 | BYPASS ALLOWED 4 | BYPASS ALLOWED | BYPASS NOT ALLOWED |
| STORE REQUEST TO SYSTEM MEMORY | BYPASS ALLOWED | BYPASS ALLOWED | BYPASS ALLOWED | BYPASS ALLOWED | BYPASS ALLOWED | BYPASS ALLOWED | BYPASS NOT ALLOWED |
| LOAD REQUEST TO SYSTEM MEMORY | BYPASS ALLOWED | BYPASS ALLOWED | BYPASS ALLOWED | BYPASS ALLOWED | BYPASS NOT ALLOWED | BYPASS ALLOWED | BYPASS ALLOWED |
| LOAD COMPLETION FROM SYSTEM MEMORY | BYPASS ALLOWED | BYPASS ALLOWED | BYPASS ALLOWED | BYPASS NOT ALLOWED | BYPASS NOT ALLOWED | BYPASS NOT ALLOWED | BYPASS NOT ALLOWED 5 |

Fig. 4 (CON'T)

SYSTEM FOR DETERMINING WHETHER A SUBSEQUENT TRANSACTION MAY BE ALLOWED OR MUST BE ALLOWED OR MUST NOT BE ALLOWED TO BYPASS A PRECEDING TRANSACTION

CROSS REFERENCE TO RELATED APPLICATION

The present invention is related to the following pending U.S. Patent Application which is hereby incorporated herein by reference:

Ser. No. 09/221,930 entitled "Apparatus and Method For Fabric Ordering Load/Store to Input/Output Devices and Direct Memory Access Peer-to-Peer Transactions".

TECHNICAL FIELD

The present invention relates in general to data processing systems, and in particular, to transaction ordering in multiple processor node data processing system architectures.

BACKGROUND INFORMATION

Modern data processing systems incorporate a plurality of processing nodes. Each node may itself include one or more central processing units ("CPU"), system memory, which may itself include cache memory, peripheral devices, and a peripheral host bridge ("PHB") coupling a system bus to a peripheral bus.

Additionally, modern data processing systems having multiple processors may implement a shared memory environment. In such environments, a processor, or processors, in one node may access the memory in the other nodes. Typical environments for implementing shared memory across multiple nodes are the non-uniform memory access (NUMA) environment and the cache-only memory access (COMA) environment. Additionally, it is desirable in these systems to implement direct memory access (DMA) by devices in each node, to both local memory and remote memory.

The nodes in such a NUMA or COMA system are coupled via a device, referred to as a "fabric," which mediates the transactions therebetween. Node-node transactions across the fabric, which may include load/store operations to system memory and DMA transactions to system memory, may give rise to coherency loss, unless the fabric includes a mechanism for transaction ordering. Coherency constraints may be imposed by the architecture of the CPUs in each node, and may also be imposed by the architecture of the buses in each node. Additionally, transaction ordering must be imposed to avoid deadlocks and assuring data in the coherency domain of the system following I/O interrupts. Thus, there is a need in the art for an apparatus and methods for implementing transaction ordering rules across the fabric connecting multiple nodes in a shared memory environment that preserves coherency and avoids transaction deadlocks.

SUMMARY OF THE INVENTION

The aforementioned needs are addressed by the present invention. Accordingly, there is provided, in a first form, a data processing system including a fabric bridge. The fabric bridge is operable for mediating transactions between nodes in the data processing system, the fabric controlling a sequence of transactions between the nodes wherein the fabric bridge determines an ordering of a preceding transaction and a subsequent transaction. The ordering is one of the subsequent transaction may be allowed to bypass, must be allowed to bypass, and must not be allowed to bypass, the preceding transaction.

There is also provided, in a second form, a method of mediating transactions between nodes in a data processing system. The method includes the step of controlling a sequence of transactions between the nodes by determining an ordering of a preceding transaction and a subsequent transaction, the ordering is one of the subsequent transaction may be allowed to bypass, must be allowed to bypass, and must not be allowed to bypass, the preceding transaction.

Additionally, there is provided, in a third form a computer program product operable for storage on program storage media, the program product operable for mediating transactions between nodes in a data processing system. The program product includes programming for controlling a sequence of transactions between the nodes by determining an ordering of a preceding transaction and a subsequent transaction, the ordering being one of the subsequent transaction may be allowed to bypass, must be allowed to bypass, and must not be allowed to bypass, the preceding transaction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates, in tabular form, ordering rules implemented by the methodology in FIG. 3.

DETAILED DESCRIPTION

Figure 1:
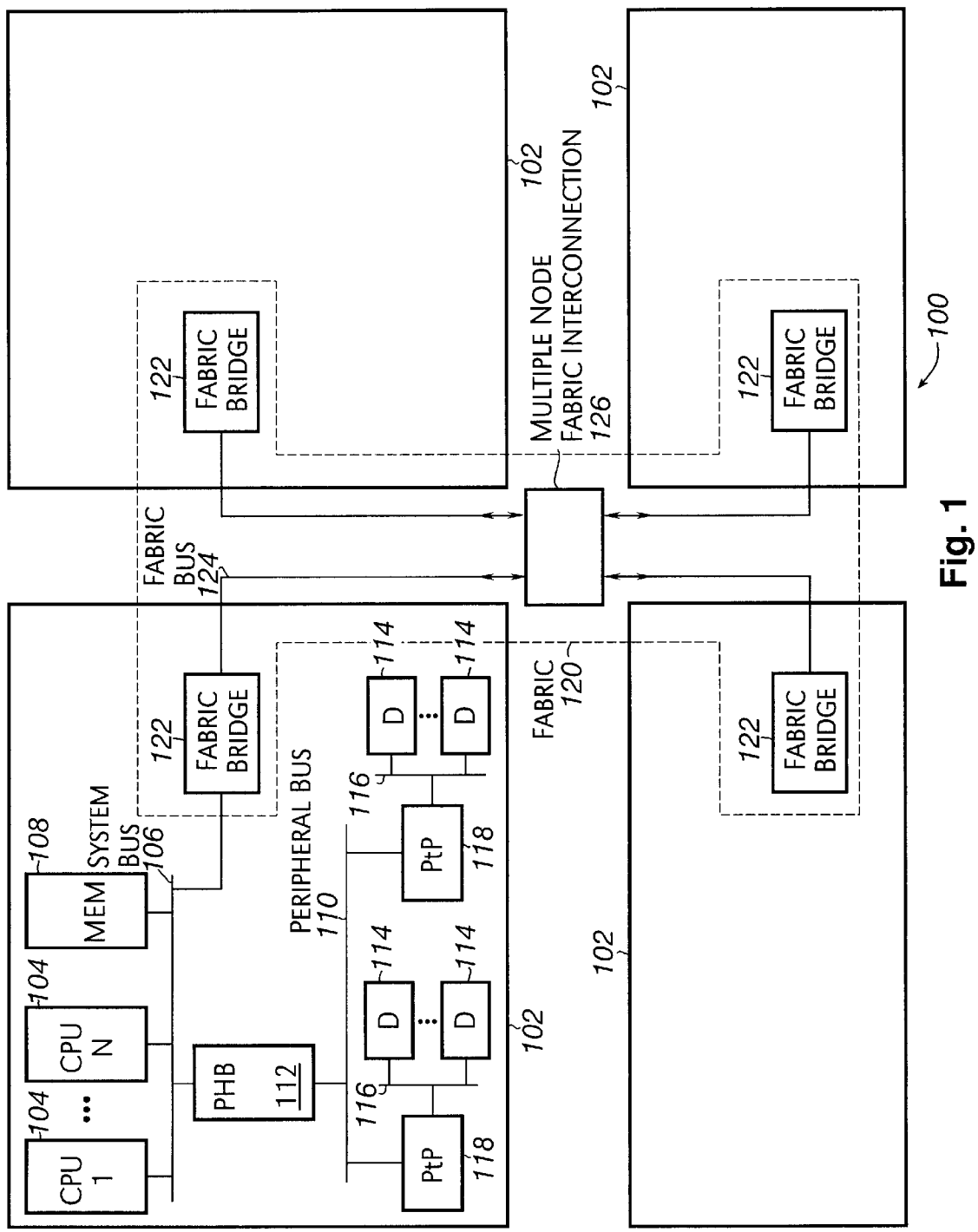
FIG. 1 illustrates a shared memory data processing system in accordance with an embodiment of the present invention.

The present invention provides a mechanism for ordering transactions through a fabric coupling multiple nodes in a shared resource data processing system environment. Load/store and DMA transactions across the fabric are controlled by a state machine which orders the transactions. The state machine determines whether a subsequent transaction may bypass a preceding transaction in accordance with a predetermined rule set. Transaction ordering in a bus bridge has been disclosed in commonly assigned U.S. Pat. No. 5,694,556 to Neal, et al, and which is hereby incorporated herein by reference. The present invention provides a transaction ordering mechanism in a NUMA or COMA environment.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Refer now to FIG. 1 illustrating a multi-node data processing system 100 in accordance with the principles of the present invention. Each node 102 includes a plurality, N, of CPUs 104 coupled to a system bus 106. A portion of system memory, memory 108 is also included in each node, and is coupled to system bus 106.

Peripheral devices reside on a peripheral bus 110, and are interfaced to the system bus via a peripheral host bridge (PHB) 112. Additionally, the peripheral devices, such as devices 114 may themselves reside on one or more sub-buses 116 which are coupled to peripheral bus 110 via peripheral-to-peripheral (denoted PtP on FIG. 1) bridges 118. Such an implementation may be employed in order to meet fanout specifications with respect to peripheral bus 110. For example, peripheral bus 110 may, in the embodiment of the present invention, be a peripheral component interconnect (PCI) bus wherein each bus of this type supports ten loads on the bus. It would be understood, however, by an artisan of ordinary skill that the present invention may be provided in other embodiments of shared memory data processing systems, and is not restricted to systems in which peripheral bus 110 is a PCI bus.

Nodes 102 are coupled via fabric 120. Fabric 120 includes fabric bridges 122 and multiple node fabric interconnection 126. Devices within first node 102, such as CPUs 104 or one of peripheral devices 114 may engage in transactions with another device, or memory, in another of nodes 102. These transactions are mediated by fabric bridge 122. Fabric bridge 122 and multiple node fabric interconnection 126, for example, may be in an embodiment of the present invention a scalable coherent interface (SCI), or, alternatively, an electronic switching fabric.

In an embodiment of the present invention, bridge 122 may mediate load/store transactions to system memory, wherein system memory includes memory 108 in each of nodes 102. Additionally, transactions may include DMA operations to system memory. Although system 100 in FIG. 1 has been illustrated as having four nodes 102, it would be understood by an artisan of ordinary skill that a multi-node data processing system 100, in accordance with the principles of the present invention, may include any predetermined number of nodes 102, and such an embodiment would be within the spirit and scope of the present invention.

Figure 2A:
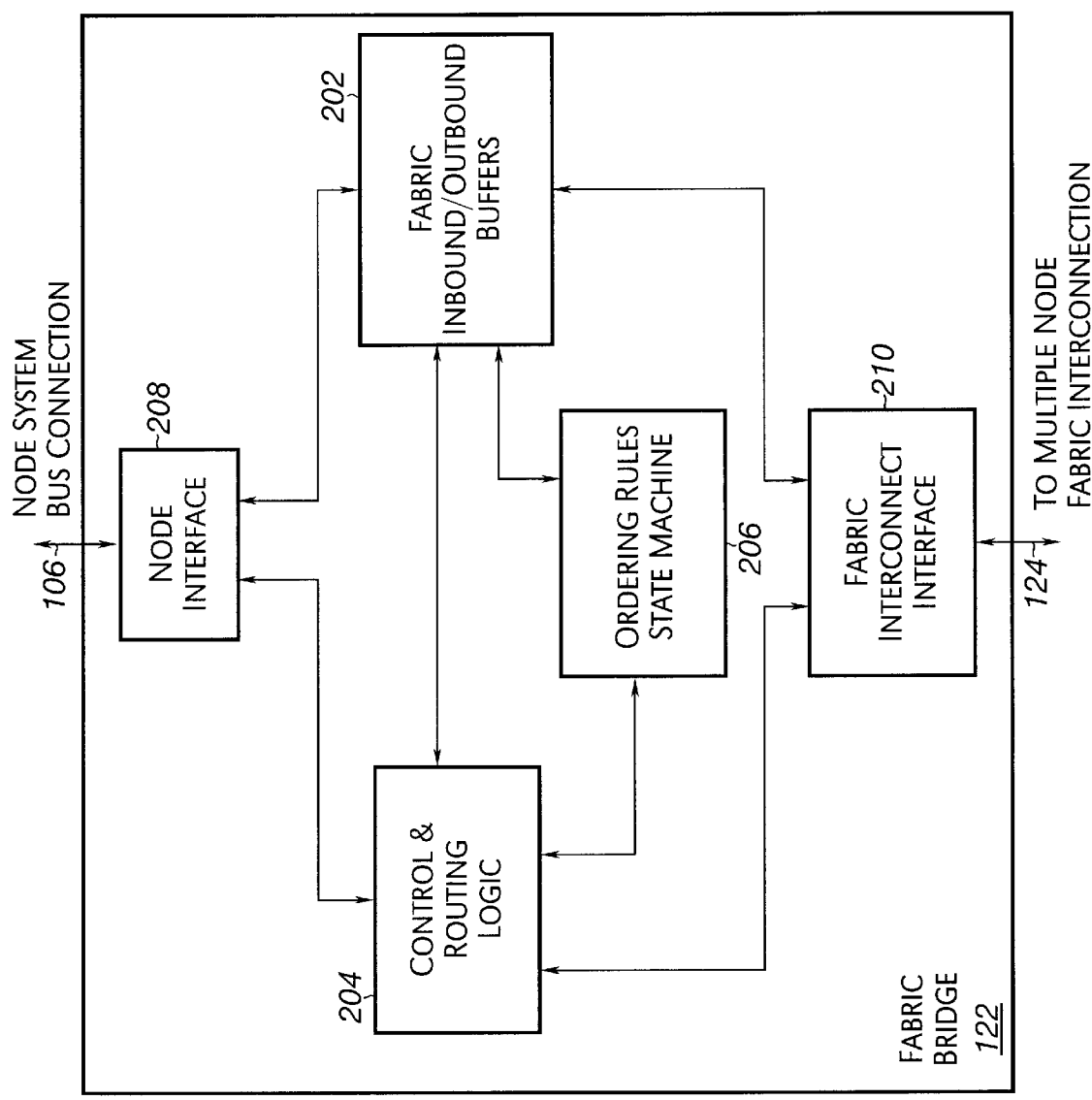
FIG. 2A illustrates, in block diagram form, a fabric bridge in accordance with an embodiment of the present invention.
Figure 2B:
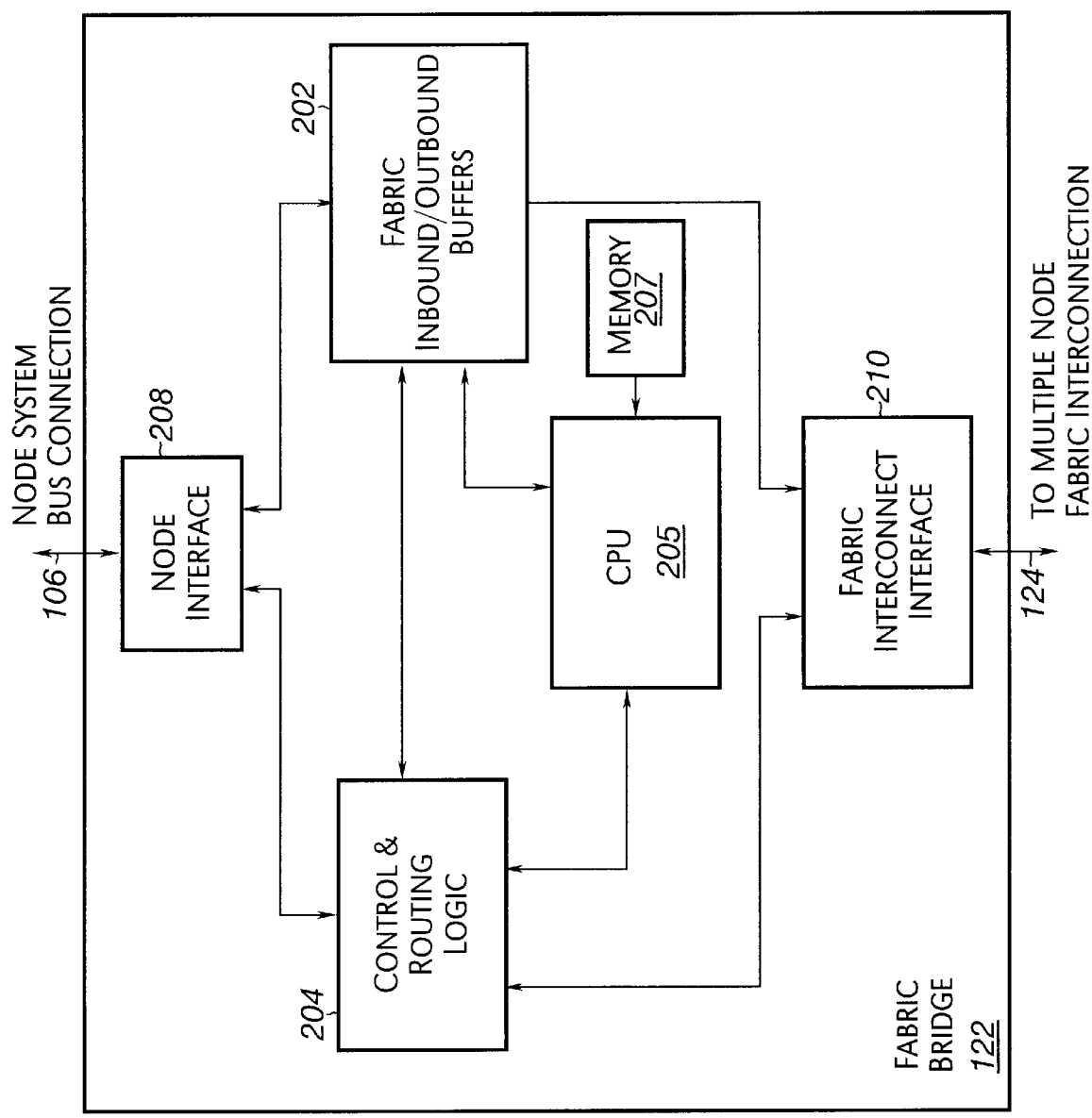
FIG. 2B illustrates, in block diagram form, a fabric bridge in accordance with an alternative embodiment of the present invention.

Refer now to FIG. 2 illustrating fabric bridge 122 in further detail. Bridges 122 are coupled to each node via a multiple node fabric interconnection 126, which communicates data and control signals between the node and the bridge. The control signals inform the interconnection of the transaction to be performed. Data to be transferred in a transaction may be posted in buffers 202. For example, for a delayed read request to system memory in a DMA operation, the requesting device 114 in a first node 102 may attempt a read request that is targeted to a memory 108 that is physically located in a second node 102, which is then buffered in fabric bridge 122. Then fabric bridge 122 forwards the request to memory 108 in the second node 102. The data received from memory 108 in the second, destination, node 102 may then be stored in buffer 202, and forwarded to the requesting PHB 112 and then provided to the requesting device 114 when the requesting device 114 re-attempts its request.

Transaction requests executed on the system bus 106 by the PHB 112 that are destined for another node 102 are then accepted by the fabric bridge 122 in the requesting node 102. These transactions are then buffered in buffer 202 and are received by control and routing logic 204 and state machine 206 performs the operations for controlling the particular internode transaction. In an alternative embodiment of fabric bridge 122 illustrated in FIG. 2B, CPU 205 performs as the ordering rules state machine, in accordance with a program of instructions stored in memory 207. Transactions to or from a system at a node 102 exit or enter the fabric bridge at node interface 208. Similarly, transactions to or from other nodes 102 exit or enter the fabric bridge at fabric connect interface 210.

Figure 3A:
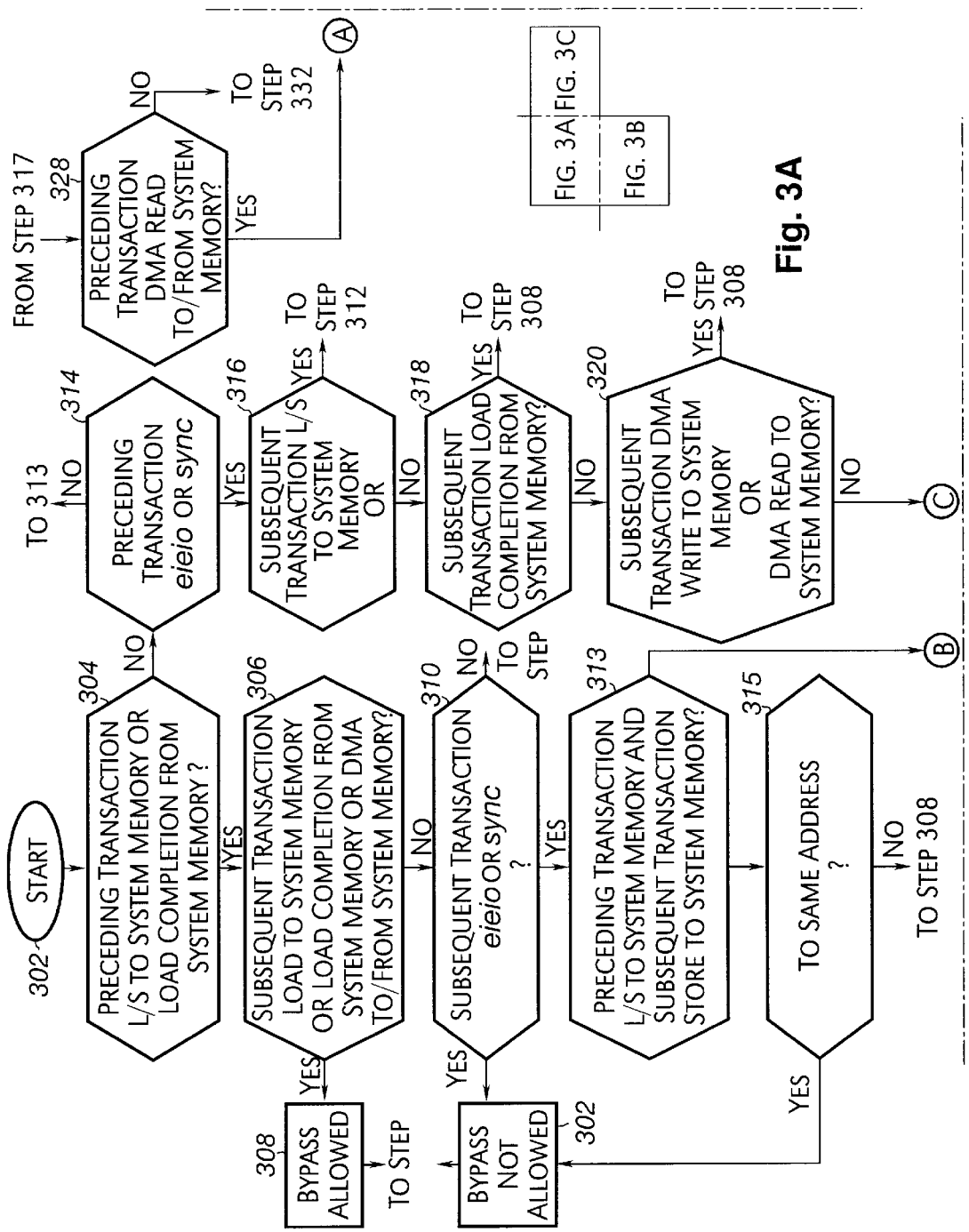
FIG. 3 illustrates, in flowchart form, a method of transaction ordering in accordance with an embodiment of the present invention.
Figure 3B:
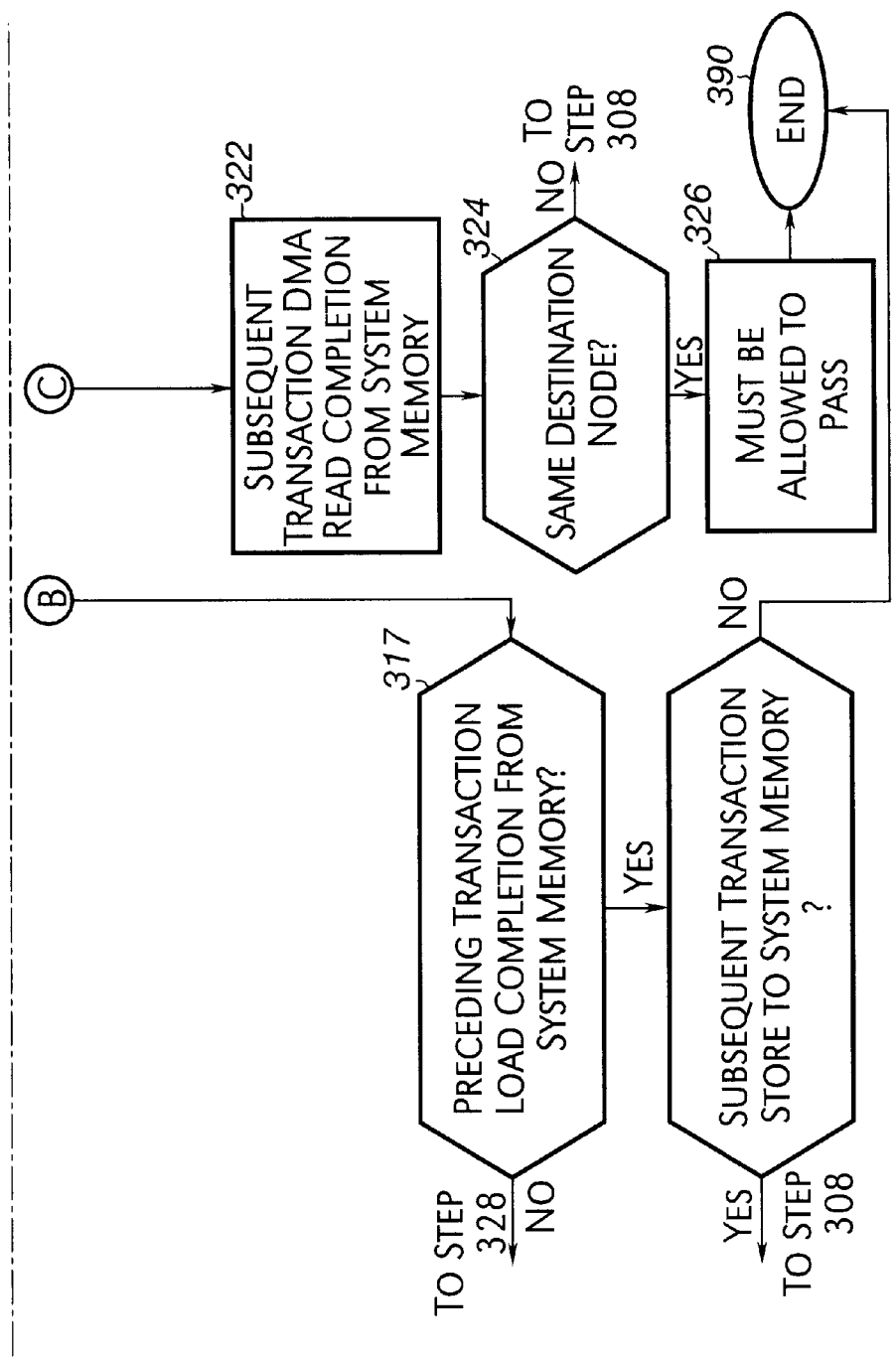
Figure 3C:
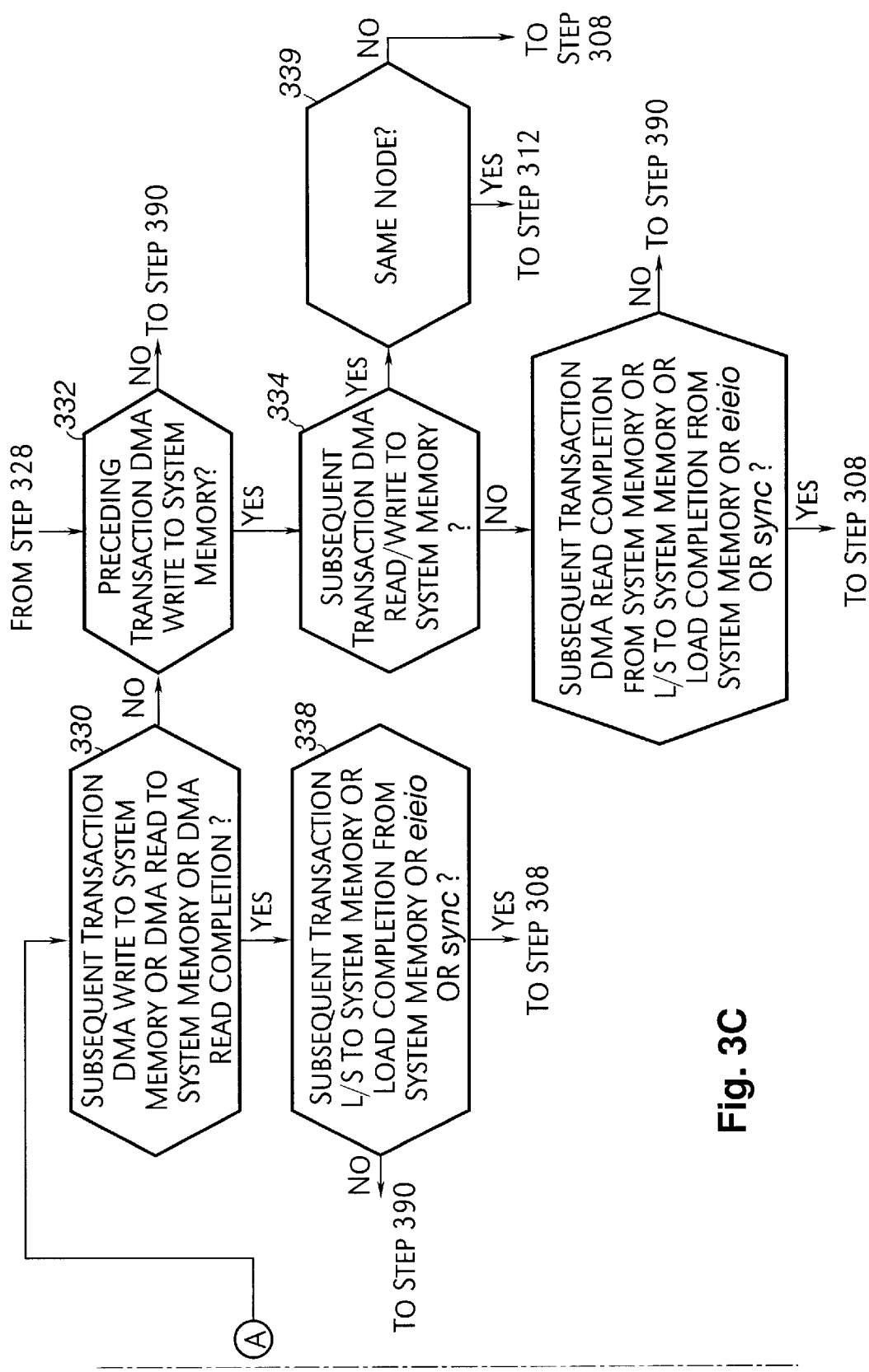

Transactions between nodes 102 are continually being communicated across fabric 120 in FIG. 1. In order that data coherency be preserved and appropriate ordering constraints which may be imposed both by the architecture of CPUs 104 and peripheral bus 110 be observed, state machine 206 or, alternatively, CPU 205 under the control of instructions in memory 207, must implement transaction ordering rules, whereby the execution of a subsequent transaction is constrained by a preceding transaction. In other words, state machine 206 or, alternatively, CPU 205 determines, from a set of ordering rules, when a subsequent transaction either may be allowed to be performed ahead of a preceding transaction if it has become temporarily stalled, must be allowed to execute ahead of a preceding transaction, or must be executed in order, that is, must not be allowed to execute ahead of a preceding transaction. State machine 206 or CPU 205 determines orderings in accordance with the methodology 300 illustrated in flowchart form, in FIG. 3.

Methodology 300 initiates in step 302 and determines if a preceding transaction is a load or store to system memory or a load completion from system memory, step 304. An instruction in which the transaction corresponds to a data read, is implemented as a read request. That is, the initiating device issues the request, and is then free to perform other tasks. If the transaction is destined for another node 102, then the fabric bridge 122 in the source node will accept the transaction and route it to the appropriate node. If the transaction is a delayed completion transaction from another node 102, the fabric bridge 122 will forward the transaction to the appropriate CPU 104 as in the case of step 304. A load instruction is turned herein to a load to system memory and is routed to the appropriate system memory 108.

If, in step 304 the preceding transaction is a load or store (L/S) to system memory or a load completion from system memory, then in step 306, state machine 206 in accordance with methodology 300 determines if the subsequent transaction is a load to system memory or a load completion from system memory or a DMA transaction to system memory of any type, that is, a write request to system memory, a read request to system memory, or a read completion from system memory. Then, in step 308 the subsequent transaction is allowed to bypass the preceding transaction. Otherwise, if in step 306 the subsequent transaction is not a load to system memory, a load completion from system memory or a DMA transaction to/from system memory, methodology 300 proceeds to step 310.

CPUs 104 may implement instructions that impose an ordering on bus transactions. For example, the Power PC architecture ("Power PC" is a trademark of IBM Corporation) implements sync and eieio (enforce in-order execution of I/O) instructions. Execution of the sync instruction ensures that all load and store instructions prior to the sync instruction are completed on the bus before program execution proceeds past the sync instruction. The eieio instruction execution causes all load and store instructions prior to the execution of the eieio instruction to be marked for performance on the bus before any load and store instructions subsequent to the execution of the eieio instruction.

Therefore, in step 310, methodology 300, which may be used in a fabric bridge 122 in FIG. 1 supporting the Power PC architecture, determines if a subsequent transaction is an eieio or sync instruction. If, in step 310, the subsequent transaction is an eieio or sync then, methodology 300 inhibits the subsequent transaction from bypassing the preceding transaction, in step 312, and ordering methodology 300 then ends in step 390. If, however, in step 310 bridge 122 employing methodology 300 is embodied in a data processing system 100 in which CPUs 104 do not implement a sync or eieio instruction or the subsequent transaction is not an eieio or sync, methodology 300 proceeds to step 390. Returning to step 304, if the "No" path is taken, methodology 300 moves to step 314, and if the preceding transaction is not an eieio or sync transaction, state machine 206, FIG. 2, executing methodology 300 goes to step 313 and recognizes that the previous transaction is a L/S to system memory and the subsequent transaction is a store to system memory. It is then determined, in step 315 if the previous and subsequent transactions are to the same address. If so, methodology 300 does not allow the subsequent transaction to bypass the preceding transaction, in step 312. Otherwise, in step 315 the "No" branch is followed and the subsequent transaction may bypass the preceding transaction, in step 308.

Returning to step 314, if the preceding transaction is an eieio or sync instruction, then the subsequent transactions are then tested. If the subsequent transaction is, in step 316 an L/S to system memory or an eieio or sync instruction then a bypass is not allowed, in step 312. Otherwise, in step 318, methodology 300 determines if the subsequent transaction is a load completion from system memory. If so, bypass of the preceding transaction by the subsequent load completion from system memory is allowed, step 308. Otherwise, if the subsequent transaction is a DMA write or read to system memory, in step 320, then bypass is permitted, in step 308, and methodology 300 terminates in step 390.

If, however, a subsequent transaction, in step 320, was not a DMA write to system memory or a DMA read to system memory then, in step 322, state machine 206, FIG. 2, executing the steps of methodology 300 recognizes that the subsequent transaction is a DMA read completion from system memory. Then, in step 324 it is determined if the destination node for the data being returned in the read completion is the same in the subsequent and preceding transactions. If the destination nodes are different then bypass may be allowed, in step 308. Otherwise, in step 324 it is determined the destination node is the same, and, in step 326 the subsequent DMA read completion must be allowed to pass the preceding eieio or sync transaction from step 314. Then, methodology 300 ends in step 390.

Return to step 313, if the previous transaction was not a L/S to system memory, then methodology 300 goes to step 317. If the previous transaction was a load completion from system memory, and the subsequent transaction was a store to system memory, then the subsequent transaction is allowed to bypass in step 308. If not, the methodology 300 ends in step 390.

Returning to step 317, if the preceding transaction is not a load completion from system memory, then methodology 300 recognizes, in step 328, the preceding transaction is a DMA read transaction to or from system memory. That is, may be either a read request to system memory or a read completion from system memory. Methodology 300 then determines if the subsequent transaction is a write request to system memory or a read request to system memory or a DMA read completion in step 330. If "Yes", then the subsequent transaction is allowed to pass in step 308. If not, methodology 300 ends in step 390. Returning to step 328, if the previous transaction was not a DMA read to/from system memory, then go to step 332.

In step 332, it is determined if the preceding transaction was a DMA write to system memory. If the preceding transaction is step 332 is a DMA write, then in step 334, it is determined if subsequent transaction is a DMA write or read to system memory, and methodology 300 determines in step 339 if the previous and subsequent transactions are from the same node. If so, then bypass is prohibited, in step 312. Otherwise, if in step 339 the previous and subsequent transactions are from different nodes then bypass of the preceding DMA write to system memory by the subsequent DMA transaction may be allowed, step 308. If, however, in step 334, the preceding transaction is not a DMA write to system memory then, in step 340, the fabric executing methodology 300 recognizes that the subsequent transaction is either a DMA read to system memory or a DMA read completion from system memory, or a L/S to system memory or a load completion or an eieio or sync and bypass of the previous DMA write by the subsequent DMA transaction may be allowed, step 308. If not, then methodology ends in step 390.

The ordering protocols implemented by methodology 300 may be summarized as illustrated in the table in FIG. 4. The table in FIG. 4 defines sets of transaction pairs that are ordered as indicated by the corresponding entry in the table, where "A" indicated preceding/subsequent transactions in which the subsequent transaction may be allowed to bypass the preceding transaction, "Y" indicates the subsequent transaction must be allowed to bypass the preceding transaction, and "N" indicates the subsequent transaction must not be allowed to bypass the preceding transaction.

The present invention provides a mechanism for a fabric bridge in a multi-node, multiprocessor data processing system. Under control of the state machine included in the fabric bridge, transactions between nodes mediated by the fabric bridge may be ordered in accordance with the methodology executed by the state machine. The bridge thereby orders transactions mediated by the bridge so that coherency requirements are preserved, and deadlocks avoided.

What is claimed is:

1. A data processing system comprising:
    a fabric bridge operable for mediating transactions between nodes in said data processing system, said fabric bridge being operable for controlling a sequence of transactions between said nodes wherein said fabric bridge determines an ordering of a preceding transaction an a subsequent transaction, said ordering being one of said subsequent transaction may be allowed to bypass, must be allowed to bypass and must not be allowed to bypass, said preceding transaction;
    wherein said ordering is said subsequent transaction may be allowed to bypass, said subsequent transaction must be allowed, and said subsequent transaction must not be allowed to bypass, when said preceding and subsequent transactions are in one of a first, a second and a third predetermined sets of transactions pairs, respectively.

2. The data processing system of claim 1 wherein said fabric bridge determines said transaction ordering according to a predetermined protocol.

3. The data processing system of claim 1 wherein said first, second and third sets are determined according to a predetermined protocol.

4. The data processing system of claim 1 wherein said fabric bridge further includes:
control circuitry operable for controlling said sequence of transactions between said nodes, said control circuitry determining an ordering of said preceding transaction and said subsequent transaction.

5. The data processing system of claim 4 wherein said control circuitry includes a state machine, said state machine determining an ordering of said preceding transaction and said subsequent transaction in accordance with a predetermined protocol.

6. The data processing system of claim 4 further including at least one buffer operable for storing transaction information, said buffer communicating transaction information in response to a signal from said control circuitry.

7. The data processing system of claim 1 wherein said sequence of transactions includes direct memory access (DMA) to system memory and load/store to system memory.

8. The data processing system of claim 7 wherein said sequence of transactions further includes eieio and sync instructions.

9. The data processing system of claim 1 further including a plurality of central processing units (CPU) coupled to said fabric bridge, each CPU being operable for generating one or more transactions of said sequence of transactions.

10. A method of mediating transactions between nodes in a data processing system comprising the steps of:
controlling a sequence of transactions between said nodes by determining an ordering of proceeding transaction and subsequent transaction, said ordering being one of said subsequent transaction may be allowed to bypass, must be allowed to bypass, and must not be allowed to bypass, said preceding transaction wherein said ordering is said subsequent transaction may be allowed to bypass, said subsequent transaction must be allowed bypass and said subsequent transaction must not be allowed to bypass, when said first and second transactions are in one of a first, second and third predetermined sets of transaction pairs, respectively.

11. The method of claim 10 wherein said first, second and third sets are determined according to a predetermined protocol.

12. A method of mediating transactions between nodes in a data processing system comprising the steps of:
controlling a sequence of transactions between said nodes by determining an ordering of proceeding transaction and subsequent transaction, said ordering being one of said subsequent transaction may be allowed to bypass, must be allowed to bypass, and must not be allowed to bypass, said preceding transaction wherein in step of controlling said sequence of transactions includes providing control circuitry operable for controlling said sequence of transactions between said nodes, said control circuitry determining and ordering of said preceding transaction and said subsequent transaction, and wherein said control circuitry includes a state machine, said state machine determining an ordering of said preceding transaction and said subsequent transaction in accordance with a predetermined protocol.

13. The method of claim 12 wherein the step of controlling said sequence of transactions includes further includes:
providing at least one buffer operable for storing transaction information; and
communicating transaction information via said buffer in response to a signal from said control circuitry.

14. A method of mediating transactions between nodes in a data processing system comprising the steps of:
controlling a sequence of transactions between said nodes by determining an ordering of proceeding transaction and subsequent transaction, said ordering being one of said subsequent transaction may be allowed to bypass, must be allowed to bypass, and must not be allowed to bypass, said preceding transaction wherein said sequence of transactions includes direct memory access (DMA) to system memory and load/store to system memory.

15. The method of claim 14 wherein said sequence of transactions further includes eieio and sync instructions.

16. A method of mediating transactions between nodes in a data processing system comprising the steps of:
controlling a sequence of transactions between said nodes by determining an ordering of proceeding transaction and subsequent transaction, said ordering being one of said subsequent transaction may be allowed to bypass, must be allowed to bypass, and must not be allowed to bypass, said preceding transaction wherein said sequence of transactions includes transactions generated by a plurality of central processing units (CPUs).

17. A computer program product operable for storage on program storage media, the program product operable for mediating transactions between nodes in a data processing system, the program product comprising:
programming for controlling a sequence of transactions between said nodes by determining and order of a preceding transaction and a subsequent transaction, said ordering being one of said subsequent transaction may be allowed to bypass, must be allowed bypass, and must not be allowed to bypass, said preceding transaction wherein said subsequent transaction may be allowed to bypass, said subsequent transaction must be allowed to bypass, and said subsequent transaction must not be allowed to bypass, when said first and second transactions are in one of a first, second and third predetermined sets of transactions pairs, respectively.

18. The program product of claim 17 wherein said first, second and third sets are determined according to a predetermined protocol.

19. A computer program product operable for storage on program storage media, the program product operable for mediating transactions between nodes in a data processing system, the program product comprising:
programming for controlling a sequence of transactions between said nodes by determining and order of a preceding transaction and a subsequent transaction, said ordering being one of said subsequent transaction may be allowed to bypass, must be allowed bypass, and must not be allowed to bypass, said preceding transaction wherein said programming for controlling said sequence of transactions includes programming for control circuitry operable for controlling said sequence of transaction between said nodes, said control circuitry determining and ordering of said preceding transaction and said subsequent transaction in response to said programming and wherein said control circuitry includes a state machine, said state machine determining an ordering of said preceding transaction and said subsequent transaction in accordance with a predetermined protocol in response to said programming.

20. The program product of claim 19 wherein said programming for controlling said sequence of transactions includes further includes:

programming for controlling at least one buffer operable for storing transaction information; and programming for communicating transaction information via said buffer in response to a signal from said control circuitry.

21. A computer program product operable for storage on program storage media, the program product operable for mediating transactions between nodes in a data processing system, the program product comprising:

programming for controlling a sequence of transactions between said nodes by determining and order of a preceding transaction and a subsequent transaction, said ordering being one of said subsequent transaction may be allowed to bypass, must be allowed bypass, and must not be allowed to bypass, said preceding transaction wherein said sequence of transactions includes direct memory access (DMA) to system memory and load/store to system memory.

22. The program product of claim 21 wherein said sequence of transactions further includes eieio and sync instructions.

23. A computer program product operable for storage on program storage media, the program product operable for mediating transactions between nodes in a data processing system, the program product comprising:

programming for controlling a sequence of transactions between said nodes by determining and order of a preceding transaction and a subsequent transaction, said ordering being one of said subsequent transaction may be allowed to bypass, must be allowed bypass, and must not be allowed to bypass, said preceding transaction wherein said sequence of transactions includes transactions generated by a plurality of central processing units (CPUs).

* * * * *